Patented July 25, 1944

2,354,574

UNITED STATES PATENT OFFICE 2,354,574

MOISTUREPROOFED GLASSINE PAPER

Clarence M. Carson, Cuyahoga Falls, Ohio, assignor to Wingfoot Corporation, Akron, Ohio, a corporation of Delaware No Drawing. Application August 25, 1942, Serial No. 456,096

1 Claim. (Cl. 117—155)

This invention relates to a sheet material moisture proofed with a coating composition which comprises a copolymer of a vinyl halide, such as vinyl chloride or vinyl bromide, and a maleate ester. The maleate ester may be an ester of a halo or other substituted maleic acid, as for example, chloromaleic acid or bromomaleic acid or dichloromaleic acid, etc. Such a copolymer is employed with a waxy material in making the coating compositions of this invention.

The copolymer may be formed in any suitable manner. It may, for example, be produced by heating a mixture of the monomers in the form of an emulsion in a bomb. The emulsion may comprise, for example, about 3 per cent of an emulsifier, such as sodium lauryl sulfate. Citric acid and disodium phosphate may be added to keep the pH of the emulsion about 8.0. The emulsion may, for example, be formed from a mixture of 90 parts of vinyl chloride and 10 parts of diethyl alpha chloromaleate. 0.42 per cent of sodium perborate and 1.8 per cent of sodium lauryl sulfate (Duponol) may be added, and the polymerization may be carried out at 37° C. In fifty to sixty hours the monomers should be substantially completely copolymerized.

The following examples illustrate how the proportion of the vinyl halide and the ester may be varied from 90 parts of the halide and 10 parts of the ester, to 30 parts of the halide and 70 parts of the ester. These limits are illustrative and not limiting.

The esters which may be used include the dimethyl, diethyl, dipropyl, diisobutyl, diamyl, dicyclohexyl, dimethylcyclohexyl, dibenzyl, dibetachloroethyl esters of both maleic and chloromaleic acid. Mixed esters may also be used, as for example, a methyl ethyl maleate. Also a mixture of esters may copolymerize with the vinyl halide, such as a mixture of diethyl maleate and dipropyl maleate or diethyl maleate and diethyl chloromaleate.

The following examples illustrate the invention:

Example 1

The copolymer formed from 70 parts of vinyl chloride and 30 parts of diethyl maleate was dissolved in toluol as a 15 per cent solution. This was cast on glassine paper at a weight of 9 pounds per ream. It formed a clear, transparent coating. The moisture vapor transfer of the coated sheet was much less than that of an uncoated sheet. The heat seal on glassine paper was not particularly good, but on parchment was somewhat better, due to the fibrous nature of the base. The moisture vapor transfer of such a coating is high as compared to a coating of a like amount of paraffin wax. By compounding 10 per cent of paraffin (134° F.) with the copolymer, a coating with rather high resistance to the transfer of moisture vapor was obtained.

Example 2

By using 20 parts of paraffin per 100 parts of the copolymer instead of 10 parts as in Example 1, the resistance to moisture vapor transfer was increased.

Example 3

| | Parts |
|---|---|
| Copolymer of 70 parts vinyl chloride and 30 parts diethyl maleate | 100 |
| Dibutyl sebacate | 25 |
| Petrosene (an amorphous wax from Socony Vacuum Company) | 16.5 |

This composition, on evaporation of the solvent, gave a coating with a very good heat seal and high gloss and transparency. The surface was hard and dry. The moisture transfer was low when 7 to 10 pounds of the coating were applied per 3,000 square feet.

Example 4

| | Parts |
|---|---|
| Copolymer of 90 per cent vinyl chloride and 10 per cent diethyl chloromaleate | 100 |
| Paraffin (134° F.) | 20 |

Five pounds of this coating per 3,000 square feet gave fairly good resistance to moisture vapor transfer.

Example 5

| | Parts |
|---|---|
| Same copolymer as in Example 4 | 5 |
| Polymerized terpene | 5 |
| Paraffin (134° F.) | 2 |

The polymerized terpene used was that manufactured by the Pennsylvania Industrial Chemical Company and known as Piccolyte S-100. Six or 7 pounds of this coating per 3,000 square feet give low moisture vapor transfer. This coating gives a fairly good heat seal when applied to parchment. Its transparency is good.

Example 6

| | Parts |
|---|---|
| Copolyer of 60 parts vinyl chloride and 40 parts diethyl chloromaleate | 100 |
| Dibutyl sebacate | 25 |
| Paraffin (134° F.) | 50 |

This coating gives a low moisture vapor transfer when applied at the rate of about 5.5 pounds per 3,000 square feet. The coating is not particularly clear, and the heat seal is rather weak.

*Example 7*

|  | Parts |
|---|---|
| Copolymer of 50 parts vinyl chloride and 50 parts diethyl chloromaleate | 100 |
| Dibutyl sebacate | 25 |
| Paraffin (134° F.) | 75 |

This coating gave a low moisture vapor transfer when only 3 pounds of coating were applied per 3,000 square feet. The sheet had a waxy feel. It was not entirely transparent, and the heat seal was rather weak.

*Example 8*

|  | Parts |
|---|---|
| Copolymer same as Example 7 | 100 |
| Piccolyte S-100 | 25 |
| Hydrogenated methyl abietate | 25 |
| Paraffin (134° F.) | 37.5 |
| Dibutyl sebacate | 25 |

This coating gave a fairly good heat seal and high transparency on glassine. The moisture vapor transfer was relatively good when 6 pounds of coating were applied to 3,000 square feet.

*Example 9*

|  | Parts |
|---|---|
| Copolymer of 40 parts vinyl chloride and 60 parts of diethyl chloromaleate | 100 |
| Piccolyte S-100 | 25 |
| Paraffin (134° F.) | 37.5 |
| Dibutyl sebacate | 25 |

The coating composition gives a rather waxy heat seal. It is not altogether transparent. The moisture vapor transfer is relatively low.

*Example 10*

|  | Parts |
|---|---|
| Copolymer of 30 parts vinyl chloride and 70 parts diethyl chloromaleate | 100 |
| Polymerized terpene | 25 |
| Hydrogenated methyl abietate | 25 |
| Syncera wax | 37.5 |
| Dibutyl sebacate | 25 |

The polymerized terpene resin is Nypene obtained from Neville Company. The wax is an amorphous wax obtained from the Standard Oil Company. The coating was somewhat tacky, but had a very low moisture vapor transfer when applied at the rate of 6 pounds of coating per 3,000 square feet.

*Example 11*

|  | Parts |
|---|---|
| Same copolymer as in Example 9 | 100 |
| White petrolatum | 20 |
| Paraffin (134° F.) | 15 |

The coating is fairly clear, but when touched gives the impression of being slightly greasy. The moisture vapor transfer is low even though the coating is applied at the rate of 2.5 to 4.0 pounds per 3,000 square feet.

Each of the foregoing examples may be coated on a variety of papers, metal foils, and synthetic sheets, such as cellulose acetate, Cellophane, polyvinyl alcohol, etc. The coated sheets are useful for packaging foodstuffs, etc. The coatings may be applied from solutions of toluol, methyl ethyl ketone, or mixtures of various proportions of the two. Other solvents may, of course, be employed. The coated sheet should be passed through a drying oven to remove the solvent. Heating to about 160-175° F. for about one minute is generally satisfactory.

Compared with paraffined paper and the like, it may be said that the coatings of this composition, when used in amounts not greater than 15 pounds per 3,000 square feet of coated surface, give somewhat stronger heat seals, have better moisture vapor resistance and a higher degree of transparency.

What I claim is:

Glassine paper coated with about six pounds of a transparent, heat-sealable coating per 3,000 square feet, which coating is composed essentially of 100 parts of a copolymer formed of substantially equal parts of vinyl chloride and diethyl chloromaleate, 25 parts of polymerized terpene, 25 parts of hydrogenated methyl abietate, 37.5 parts of paraffin, and 25 parts of dibutyl sebacate.

CLARENCE M. CARSON.